Jan. 6, 1931.  J. E. JOHNSON  1,787,627
WINDOW SCREEN
Filed March 1, 1929
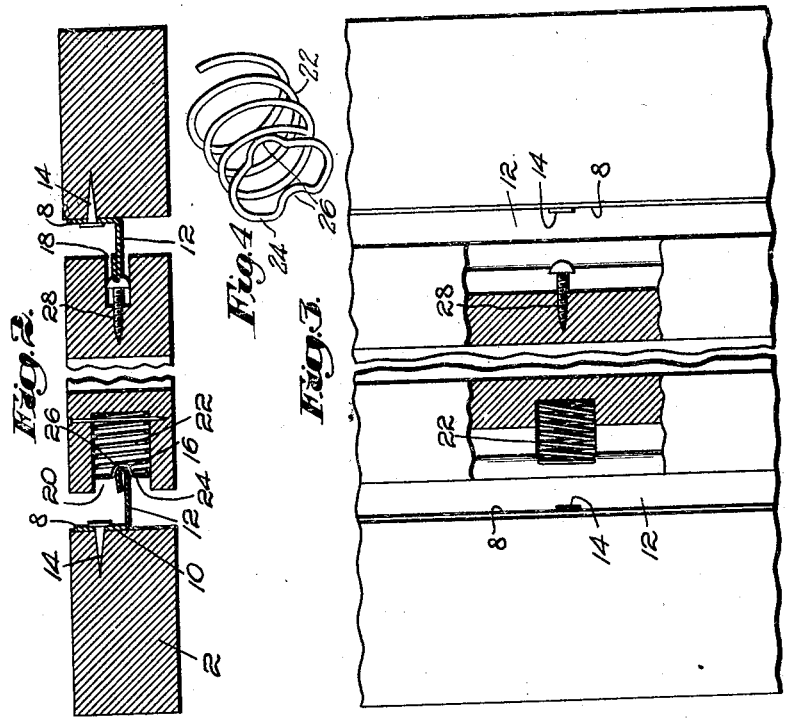
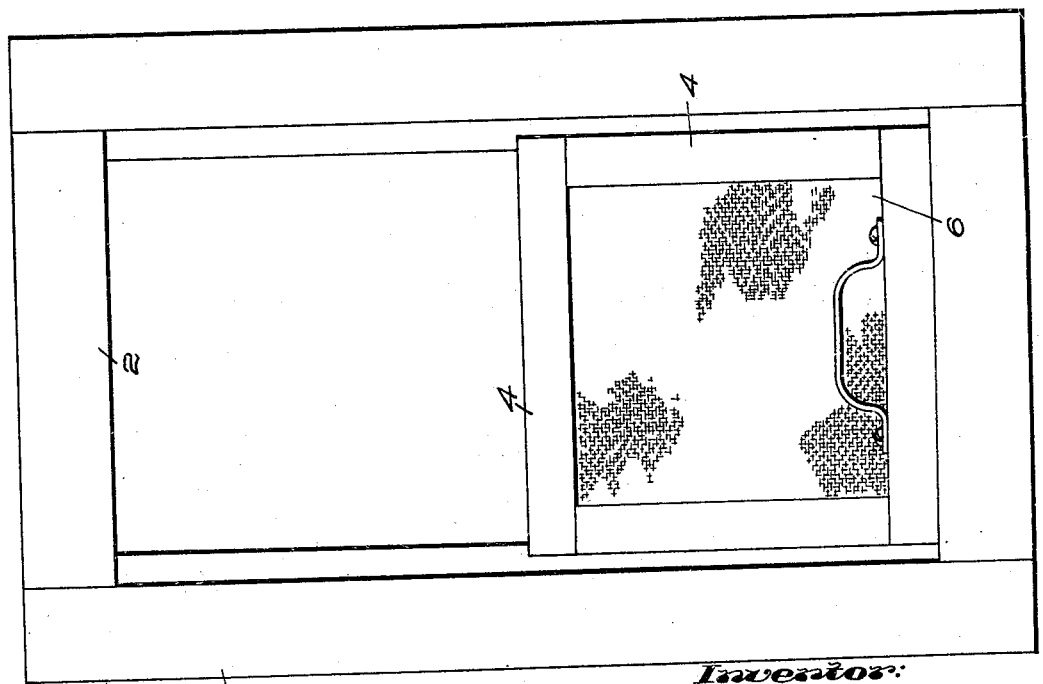
Inventor:
Joseph E. Johnson
by Emery, Booth, Janney & Varney
Attys Patented Jan. 6, 1931

1,787,627

UNITED STATES PATENT OFFICE

JOSEPH E. JOHNSON, OF ROSLINDALE, MASSACHUSETTS

WINDOW SCREEN

Application filed March 1, 1929. Serial No. 343,659.

This invention relates to window screens.

The invention has for its objects among other things to provide a window screen that shall be readily adaptable to provide a tight closure without changing the width of the screen, even in cases where the width of the window frames show a considerable variation. Another object is to provide a more durable and reliable type of spring in place of the usual flat spring heretofore used. Another object is to provide more efficient and durable guiding means for the guiding rib upon which the screen slides, said rib in accordance with the present invention being preferably of metal. These and other objects and aims of the invention will be best understood from the following description taken in connection with the accompanying drawings of a screen embodying one illustrative embodiment of the invention, the scope of the invention being more particularly pointed out in the appended claims.

In the drawings:

Figure 1 is a face view of a screen structure, embodying one embodiment of the invention selected for illustrative purposes;

Fig. 2 is a horizontal cross section through the lateral screen frame members and window frame members showing the guides, spring and other cooperating parts;

Fig. 3 is a view with the frame broken away, showing the same parts in front elevation.

Fig. 4 is a detail perspective view of one of the helical springs showing the depressions in the end thereof.

Referring to the drawing the window frame is indicated at 2, the screen frame at 4 and the wire mesh of the screen by 6, the latter being secured to the screen frame in any suitable manner. All of the above referred to parts may be of the well known usual construction.

Any suitable guide, of any suitable material, may be used in accordance with my invention but I preferably use a metal guide. This guide may be of any suitable construction, and in the embodiment of the invention herein described, consists of a metal plate 8 (Fig. 2) bent longitudinally at a right angle to form two sections 10 and 12, the former secured in any suitable manner as by tacks 14 to the edge of the window frame, the section 12 being preferably bent back upon itself to form a rounded guiding edge 16.

In each of its lateral edge surfaces, the screen is provided with a guiding groove 18 for the guide 12. In accordance with the present invention one of these guide grooves 18 is provided at intervals with enlargements to constitute spring-receiving chambers 20. In accordance with my invention, I prefer to use helical springs 22 in place of the flat springs heretofore used and the spring-receiving chambers are preferably made cylindrical as shown to receive such springs. For a screen of ordinary size two springs will ordinarily suffice, said springs being suitably spaced, but any number that may be found necessary may be used. It may be desirable to provide the outer winding 24 of the coil spring 22 with two diametrically opposed depressions as indicated at 26 in Fig. 2 to form a lodgement for the end of the guide 12. This offers the advantage that the contacting guiding surfaces, being both of metal, are less liable to wear, and furthermore, should the screen be of such a loose fit in the window frame that the springs 22 can expand outwardly to a point flush with the edge surface of the screen, the latter will be securely guided by the engagement of the depressions 26 with the guide 12. A brad may be driven through the screen frame into the spring chamber to retain the spring within said chamber. Preferably this brad will be driven in under the rabbet that holds the wire mesh in the screen.

The invention also comprises means for adjustment to accommodate reasonable variations in the width of window frames. This enables screens of the same width to be used for windows of which the screen receiving frames show variations in width. While I may use any suitable means for this purpose, I have adopted the very simple expedient of providing adjustable means or members such as nails or screws 28 in the bottom of the groove 18 opposed to that containing the springs 22. These nails or screws 28 are spaced at intervals along the groove and their heads are engaged by the guide 12. It will be readily seen that the adjustment referred to can be readily secured by inserting the nails or screws more or less as the case may be. The slot in the head of the screws 28 will preferably be vertically positioned so that it may be engaged by the guide 8 and these screws will preferably be positioned opposite the springs 22.

Screens embodying my invention possess many advantages over screens of ordinary construction. They are easier to operate and more durable and more reliable in operation. The helical springs do not lose their resiliency with time as do the ordinary flat springs so that an old screen, according to my invention, is just as readily applied to the window frame and operates with the same facility as a new one. They do not stick as where the old wooden guides are used. It is well known that wooden guides cannot be painted for the reason that this interferes with the free sliding of the screen on the guide. They can only be oil-dipped, so they retain their natural colour which often jars with the colour of the window frame and surrounding structure. The metal guides, in accordance with my invention, can be painted without interfering with the free sliding movement of the screen and the colour of the guides can thus be brought into harmony with the general colour scheme of the window. The adjustable feature, in accordance with my invention, enables the screens to be more quickly and readily fitted to the window frame and increases the range of adaptability of a screen of any given size. While possessing all of these advantages the screens, in accordance with my invention, are no more costly than ordinary screens. Other advantages will appear to those skilled in the art.

I am aware that the invention may be embodied in other specific forms without departing from the spirit or essential attributes thereof, and I therefore desire the present embodiment to be considered in all respects as illustrative and not restrictive, reference being had to the appended claims rather than to the foregoing description to indicate the scope of the invention.

Claims:

1. A window screen comprising a frame having guiding grooves in the side members thereof; metal guides adapted normally to enter said grooves; helical springs arranged in at least one of said grooves and having depressed portions in the ends thereof adapted slidably to engage the edge of one of said metal guides; and adjustable guide members arranged in the other groove adapted slidably to guide the other edge of said screen.

2. The combination of a screen comprising a frame having guiding grooves at opposite sides thereof; metal guides adapted normally to project into said grooves; helical springs secured in one of said grooves at spaced points adapted to engage the edge of one of said metal guides; said helical springs having guide receiving depressions formed in the outer ends thereof and forming (yieldable) guideways for said metal guides.

3. A screen comprising a frame having guiding grooves in the side members thereof; guides adapted to enter said grooves; spaced helical springs in one of said grooves adapted slidably to engage one of said guides, said helical springs being provided with guide receiving depressions in opposite sides of the outer terminal coils thereof to form a guideway to receive the guide thereof; and adjustable guides for the other edge of said screen adapted to slidably engage the other guide.

4. A screen comprising a slidable frame, guiding grooves in the side members of said screen; guides to cooperate with said screen, helical springs in one of said grooves having depressed portions adapted slidably to engage one of said guides; and adjustable guide engaging members in the other groove adapted to engage the other guide at a distance within its guiding groove.

5. In a window screen in combination a frame having guiding grooves in the side members thereof; spaced helical springs in one of said grooves; said springs having guiding depressions in the ends thereof spaced adjustable members in the other groove; and guides slidably engaging the depressions in said springs and adjustable members respectively at points within the side edges of said screen.

In testimony whereof I have signed my name to this specification.

JOSEPH E. JOHNSON.